United States Patent
Natarajan et al.

(10) Patent No.: US 10,690,349 B2
(45) Date of Patent: Jun. 23, 2020

(54) PREMIXING FUEL INJECTORS AND METHODS OF USE IN GAS TURBINE COMBUSTOR

(71) Applicant: General Electric Company, Schenectady, NY (US)

(72) Inventors: Jayaprakash Natarajan, Greer, SC (US); Seth Reynolds Hoffman, Spartanburg, SC (US); Ronnie Ray Pentecost, Travelers Rest, SC (US); Wei Zhao, Greer, SC (US)

(73) Assignee: General Electric Company, Schenectady, NY (US)

( * ) Notice: Subject to any disclaimer, the term of this patent is extended or adjusted under 35 U.S.C. 154(b) by 326 days.

(21) Appl. No.: 15/694,191

(22) Filed: Sep. 1, 2017

(65) Prior Publication Data

US 2019/0072279 A1 Mar. 7, 2019

(51) Int. Cl.
*F23R 3/28* (2006.01)
*F23R 3/34* (2006.01)
(Continued)

(52) U.S. Cl.
CPC .............. *F23R 3/286* (2013.01); *F02C 7/222* (2013.01); *F02C 9/26* (2013.01); *F23R 3/002* (2013.01);
(Continued)

(58) Field of Classification Search
CPC .... F23R 3/002; F23R 3/12; F23R 3/20; F23R 3/283; F23R 3/286; F23R 3/34;
(Continued)

(56) References Cited

U.S. PATENT DOCUMENTS

| 4,903,480 A | 2/1990 | Lee et al. |
| 5,220,787 A | 6/1993 | Bulman |

(Continued)

FOREIGN PATENT DOCUMENTS

| EP | 1 431 543 A2 | 6/2004 |
| EP | 3 343 108 A1 | 7/2018 |
| EP | 3 346 187 A2 | 7/2018 |

OTHER PUBLICATIONS

Extended European Search Report and Opinion issued in connection with corresponding EP Application No. 18191118.1 dated Nov. 26, 2018.

*Primary Examiner* — Jason H Duger
(74) *Attorney, Agent, or Firm* — Charlotte C. Wilson; James W. Pemrick

(57) ABSTRACT

A fuel injector for a gas turbine combustor includes side wall fuel injection bodies extending between opposite end walls. Each side wall fuel injection body defines a fuel plenum and includes an outer surface defining fuel injection ports in communication with the fuel plenum. One or more fuel injection bodies extending between the end walls are positioned between the side wall fuel injection bodies. Each fuel injection body defines a fuel plenum and includes an outer surface defining fuel injection ports in fluid communication with the fuel plenum. A conduit fitting coupled to the frame is fluidly connected to the respective fuel plenums. The fuel injection ports fluidly communicate with air flow paths defined between the fuel injection bodies and the side wall fuel injection bodies. A combustor for a gas turbine includes a liner and an axial fuel staging system with the present fuel injector.

20 Claims, 7 Drawing Sheets

(51) Int. Cl.
*F23R 3/00* (2006.01)
*F02C 9/26* (2006.01)
*F02C 7/22* (2006.01)

(52) U.S. Cl.
CPC ...... *F23R 3/34* (2013.01); *F23R 2900/00004* (2013.01)

(58) Field of Classification Search
CPC ............ F23R 3/346; F23R 2900/00004; F02C 7/222; F02C 9/26; F23D 14/045; F23D 14/10; F23D 14/105; F23D 14/22
See application file for complete search history.

(56) References Cited

U.S. PATENT DOCUMENTS

| | | | |
|---|---|---|---|
| 5,640,851 A | 6/1997 | Toon et al. | |
| 6,915,636 B2 | 7/2005 | Stuttaford et al. | |
| 7,878,000 B2 | 2/2011 | Mancini et al. | |
| 8,113,001 B2 | 2/2012 | Singh et al. | |
| 8,171,735 B2 | 5/2012 | Mancini et al. | |
| 8,387,391 B2 | 3/2013 | Patel et al. | |
| 8,407,892 B2 * | 4/2013 | DiCintio | F23R 3/06 29/889.22 |
| 8,438,856 B2 | 5/2013 | Chila et al. | |
| 8,590,311 B2 | 11/2013 | Parsania et al. | |
| 8,745,987 B2 | 6/2014 | Stoia et al. | |
| 8,863,525 B2 | 10/2014 | Toronto et al. | |
| 9,200,808 B2 * | 12/2015 | Romig | F23R 3/346 |
| 9,267,436 B2 | 2/2016 | Stoia et al. | |
| 9,291,350 B2 | 3/2016 | Melton et al. | |
| 9,303,872 B2 | 4/2016 | Hadley et al. | |
| 9,310,078 B2 * | 4/2016 | Chen | F23R 3/045 |
| 9,316,155 B2 | 4/2016 | DiCintio et al. | |
| 9,316,396 B2 | 4/2016 | DiCintio et al. | |
| 9,322,556 B2 | 4/2016 | Melton et al. | |
| 9,360,217 B2 | 6/2016 | DiCintio et al. | |
| 9,376,961 B2 | 6/2016 | Stoia et al. | |
| 9,383,104 B2 | 7/2016 | Melton et al. | |
| 9,400,114 B2 | 7/2016 | Melton et al. | |
| 2010/0077760 A1 * | 4/2010 | Laster | F23R 3/14 60/742 |
| 2011/0289928 A1 | 12/2011 | Fox et al. | |
| 2013/0174558 A1 * | 7/2013 | Stryapunin | F23R 3/286 60/734 |
| 2014/0097276 A1 * | 4/2014 | Boardman | F23D 17/002 239/589 |
| 2014/0190170 A1 * | 7/2014 | Cai | F23R 3/346 60/746 |
| 2014/0260280 A1 | 9/2014 | Willis et al. | |
| 2014/0260318 A1 | 9/2014 | Willis et al. | |
| 2014/0360193 A1 * | 12/2014 | Stoia | F23R 3/00 60/722 |
| 2016/0047317 A1 * | 2/2016 | Willis | F02C 7/22 60/740 |

* cited by examiner

PREMIXING FUEL INJECTORS AND METHODS OF USE IN GAS TURBINE COMBUSTOR

TECHNICAL FIELD

The present disclosure relates generally to fuel injectors for gas turbine combustors and, more particularly, to premixing fuel injectors for use with an axial fuel staging (AFS) system associated with such combustors.

BACKGROUND

At least some known gas turbine assemblies are used for electrical power generation. Such gas turbine assemblies include a compressor, a combustor, and a turbine. Gas (e.g., ambient air) flows through the compressor, where the gas is compressed before delivery to one or more combustors. In each combustor, the compressed air is combined with fuel and ignited to generate combustion gases. The combustion gases are channeled from each combustor to and through the turbine, thereby driving the turbine, which, in turn, powers an electrical generator coupled to the turbine. The turbine may also drive the compressor by means of a common shaft or rotor.

In some combustors, the generation of combustion gases occurs at two, axially spaced stages. Such combustors are referred to herein as including an "axial fuel staging" (AFS) system, which delivers fuel and an oxidant to one or more fuel injectors downstream of the head end of the combustor. In a combustor with an AFS system, a primary fuel nozzle at an upstream end of the combustor injects fuel and air (or a fuel/air mixture) in an axial direction into a primary combustion zone, and an AFS fuel injector located at a position downstream of the primary fuel nozzle injects fuel and air (or a second fuel/air mixture) as a cross-flow into a secondary combustion zone downstream of the primary combustion zone. The cross-flow is generally transverse to the flow of combustion products from the primary combustion zone.

In some cases, it is desirable to introduce the fuel and air into the secondary combustion zone as a mixture. Therefore, the mixing capability of the AFS injector influences the overall operating efficiency and/or emissions of the gas turbine.

Moreover, in some instances, the type of fuel introduced by the AFS injector has been limited to fuels having a heat release or a Modified Wobbe Index value in a prescribed range, in order to maintain emissions-compliant operation. Therefore, an AFS injector capable of introducing fuels having a wide range of heat release values without generating unacceptable levels of emissions is also desirable.

SUMMARY

The present disclosure is directed to an AFS fuel injector for delivering a mixture of fuel and air into a combustor in a direction transverse to the primary combustion zone flow, thereby producing a secondary combustion zone. A fuel injector for a gas turbine combustor includes side wall fuel injection bodies extending between opposite end walls. Each side wall fuel injection body defines a fuel plenum and includes an outer surface defining fuel injection ports in communication with the fuel plenum. One or more fuel injection bodies extending between the end walls are positioned between the side wall fuel injection bodies. Each fuel injection body defines a fuel plenum and includes an outer surface defining fuel injection ports in fluid communication with the fuel plenum. A conduit fitting coupled to the frame is fluidly connected to the respective fuel plenums. The fuel injection ports fluidly communicate with air flow paths defined between the fuel injection bodies and the side wall fuel injection bodies. A combustor for a gas turbine includes a liner and an axial fuel staging system with the present fuel injector.

More specifically, the fuel injector includes a frame having oppositely disposed end walls, a first side wall fuel injection body defining a first fuel plenum, and, opposite the first side wall fuel injection body, a second side wall fuel injection body defining a second fuel plenum. The first side wall fuel injection body and the second side wall fuel injection body extend axially between the end walls and, with the end walls, define an opening for passage of air. A third fuel injection body defines a third fuel plenum. The third fuel injection body extends axially between the end walls and is positioned between the first side wall fuel injection body and the second side wall fuel injection body, such that air flow paths are defined between the third fuel injection body and each of the first side wall fuel injection body and the second side wall fuel injection body. The first side wall fuel injection body includes at least one outer surface through which a first plurality of fuel injection ports is defined, the second side wall fuel injection body includes at least one outer surface through which a second plurality of fuel injection ports is defined, and the third fuel injection body includes at least one outer surface through which a third plurality of fuel injection ports is defined. Each plurality of fuel injection ports is in fluid communication with a respective fuel plenum and an adjacent air flow path of the air flow paths. A conduit fitting is coupled to the frame and fluidly connected to the respective fuel plenums of the first side wall fuel injection body, the second side wall fuel injection body, and the third fuel injection body.

In one or more embodiments, the fuel injector may further include a mounting flange coupled to the frame. In these or other embodiments, the fuel injector may further include an outlet member extending from the mounting flange in a direction opposite the frame, the outlet member being in fluid communication with the air flow paths.

In one or more embodiments, the side wall fuel injection bodies may each have a cross-sectional profile defining one of a teardrop shape, a circular shape, and a triangular shape. In embodiments in which the cross-sectional profile defines a teardrop shape, the teardrop is characterized as having a leading edge, a trailing edge opposite the leading edge, a first outer surface adjacent one of the air flow paths, and a second outer surface opposite the first outer surface. Both the first outer surface and the second outer surface extend between the leading edge and the trailing edge. The first outer surface of each side wall fuel injection body defines a respective plurality of fuel injection ports. In at least one embodiment, the fuel injection ports are disposed in a single row.

In one or more embodiments, a first axis is defined through the leading edge and the trailing edge of the first side wall fuel injection body, and a second axis is defined through the leading edge and the trailing edge of the second side wall fuel injection body. A first angle is defined between the first axis and an injection axis of the fuel injector, which is equal to a second angle defined between the second axis and the injection axis.

In one or more embodiments, the third fuel injection body has a cross-sectional profile defining a teardrop shape, which is characterized as having a leading edge, a trailing edge opposite the leading edge, and a pair of outer surfaces extending between the leading edge and the trailing edge. At least one of the pair of outer surfaces defines the third plurality of fuel injection ports. In these or other embodiments, each outer surface of the pair of outer surfaces defines a respective fuel injection surface. A first subset of the third plurality of fuel injection ports is defined through a first fuel injection surface of the pair of outer surfaces, and a second subset of the third plurality of fuel injection ports is defined through a second fuel injection surface of the pair of outer surfaces.

In one or more embodiments, a fourth fuel injection body is disposed between the end walls and positioned within the opening such that air flow paths are defined between the first side wall fuel injection body, the third fuel injection body, the fourth fuel injection body, and the second side wall fuel injection body. The fourth fuel injection body defines a fourth fuel plenum in fluid communication with the conduit fitting and includes at least one outer surface defining a fourth plurality of fuel injection ports in fluid communication with the fourth plenum. In these or other embodiments, the fourth fuel injection body has a cross-sectional profile defining a teardrop shape, characterized as having a leading edge, a trailing edge, and a pair of outer surfaces extending between the leading edge and the trailing edge.

In embodiments having both a third fuel injection body and a fourth fuel injection body, a third longitudinal axis is defined through the leading edge and the trailing edge of the third fuel injection body, and a fourth longitudinal axis is defined through the leading edge and trailing edge of the fourth fuel injection body. A third angle, which is defined between the third axis and an injection axis of the fuel injector, is equal to a fourth angle defined between the fourth axis and the injection axis.

In some embodiments, the third plurality of fuel injection ports of the third fuel injection body includes a first subset of the third plurality of fuel injection ports defined through a first fuel injection surface of the pair of outer surfaces and a second subset of the third plurality of fuel injection ports defined through a second fuel injection surface of the pair of outer surfaces. In these embodiments, the fourth plurality of fuel injection ports of the fourth fuel injection body includes a first subset of the fourth plurality of fuel injection ports defined through a first fuel injection surface of the pair of outer surfaces and a second subset of the fourth plurality of fuel injection ports defined through a second fuel injection surface of the pair of outer surfaces.

According to another aspect of the present disclosure, a combustor for a gas turbine having an axial fuel staging (AFS) system is also provided. The combustor includes a liner that defines a head end, an aft end, and at least one opening through the liner between the head end and the aft end. The axial fuel staging (AFS) system includes a fuel injector and a fuel supply line. The fuel injector is mounted to provide fluid communication through a respective one of the at least one openings in the liner, such that the fluid communication is directed in a transverse direction with respect to a longitudinal axis of the liner. The fuel supply line is coupled to the fuel injector. The injector includes a frame having oppositely disposed end walls, a first side wall fuel injection body defining a first fuel plenum, and, opposite the first side wall fuel injection body, a second side wall fuel injection body defining a second fuel plenum. The first side wall fuel injection body and the second side wall fuel injection body extend axially between the end walls and, with the end walls, define an opening for passage of air. A third fuel injection body defines a third fuel plenum. The third fuel injection body extends axially between the end walls and is positioned between the first side wall fuel injection body and the second side wall fuel injection body, such that air flow paths are defined between the third fuel injection body and each of the first side wall fuel injection body and the second side wall fuel injection body. The first side wall fuel injection body includes at least one outer surface through which a first plurality of fuel injection ports is defined, the second side wall fuel injection body includes at least one outer surface through which a second plurality of fuel injection ports is defined, and the third fuel injection body includes at least one outer surface through which a third plurality of fuel injection ports is defined. Each plurality of fuel injection ports is in fluid communication with a respective fuel plenum and an adjacent air flow path of the air flow paths. A conduit fitting is coupled to the frame and fluidly connected to the respective fuel plenums of the first side wall fuel injection body, the second side wall fuel injection body, and the third fuel injection body. The fuel supply line is coupled to the conduit fitting.

Features of one or more specific embodiments of the fuel injector are provided above. In one or more embodiments, the fuel injector is one of a plurality of fuel injectors of the combustor.

BRIEF DESCRIPTION OF THE DRAWINGS

A full and enabling disclosure of the present products and methods, including the best mode thereof, directed to one of ordinary skill in the art, is set forth in the specification, which makes reference to the appended figures, in which.

DETAILED DESCRIPTION

The following detailed description illustrates various AFS fuel injectors, their component parts, and methods of fabricating the same, by way of example and not limitation. The description enables one of ordinary skill in the art to make and use the fuel injectors. The description provides several embodiments of the fuel injectors, including what is presently believed to be the best modes of making and using the fuel injectors. An exemplary fuel injector is described herein as being coupled within a combustor of a heavy-duty gas turbine assembly. However, it is contemplated that the fuel injectors described herein have general application to a broad range of systems in a variety of fields other than electrical power generation.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape.

Figure 1:
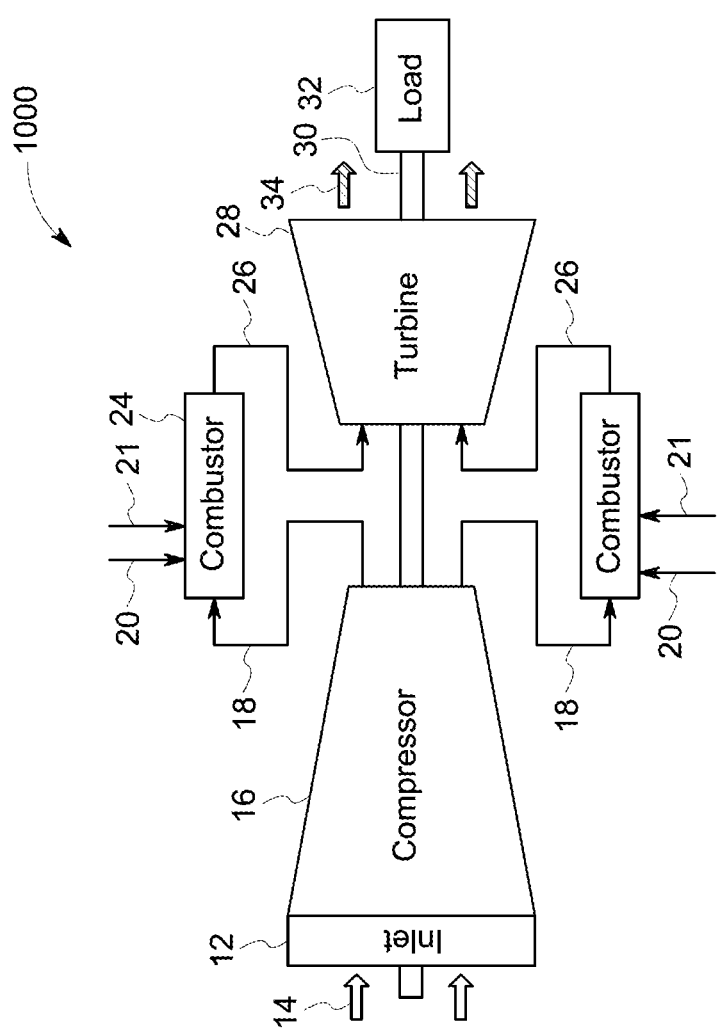
FIG. 1 is a schematic illustration of a power-generating gas turbine assembly, as may employ the present fuel injectors described herein.

FIG. 1 provides a functional block diagram of an exemplary gas turbine 1000 that may incorporate various embodiments of the present disclosure. As shown, the gas turbine 1000 generally includes an inlet section 12 that may include a series of filters, cooling coils, moisture separators, and/or other devices to purify and otherwise condition a working fluid (e.g., air) 14 entering the gas turbine 1000. The working fluid 14 flows to a compressor section where a compressor 16 progressively imparts kinetic energy to the working fluid 14 to produce a compressed working fluid 18.

The compressed working fluid 18 is mixed with a gaseous fuel 20 from a gaseous fuel supply system and/or a liquid fuel 21 from a liquid fuel supply system to form a combustible mixture within one or more combustors 24. The combustible mixture is burned to produce combustion gases 26 having a high temperature, pressure, and velocity. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section (not shown) that connects the turbine 28 to an exhaust stack downstream from the turbine. The exhaust section may include, for example, a heat recovery steam generator (not shown) for cleaning and extracting additional heat from the exhaust gases 34 prior to release to the environment.

The combustors 24 may be any type of combustor known in the art, and the present invention is not limited to any particular combustor design unless specifically recited in the claims. For example, the combustor 24 may be a can type (sometimes called a can-annular type) of combustor.

Figure 2:
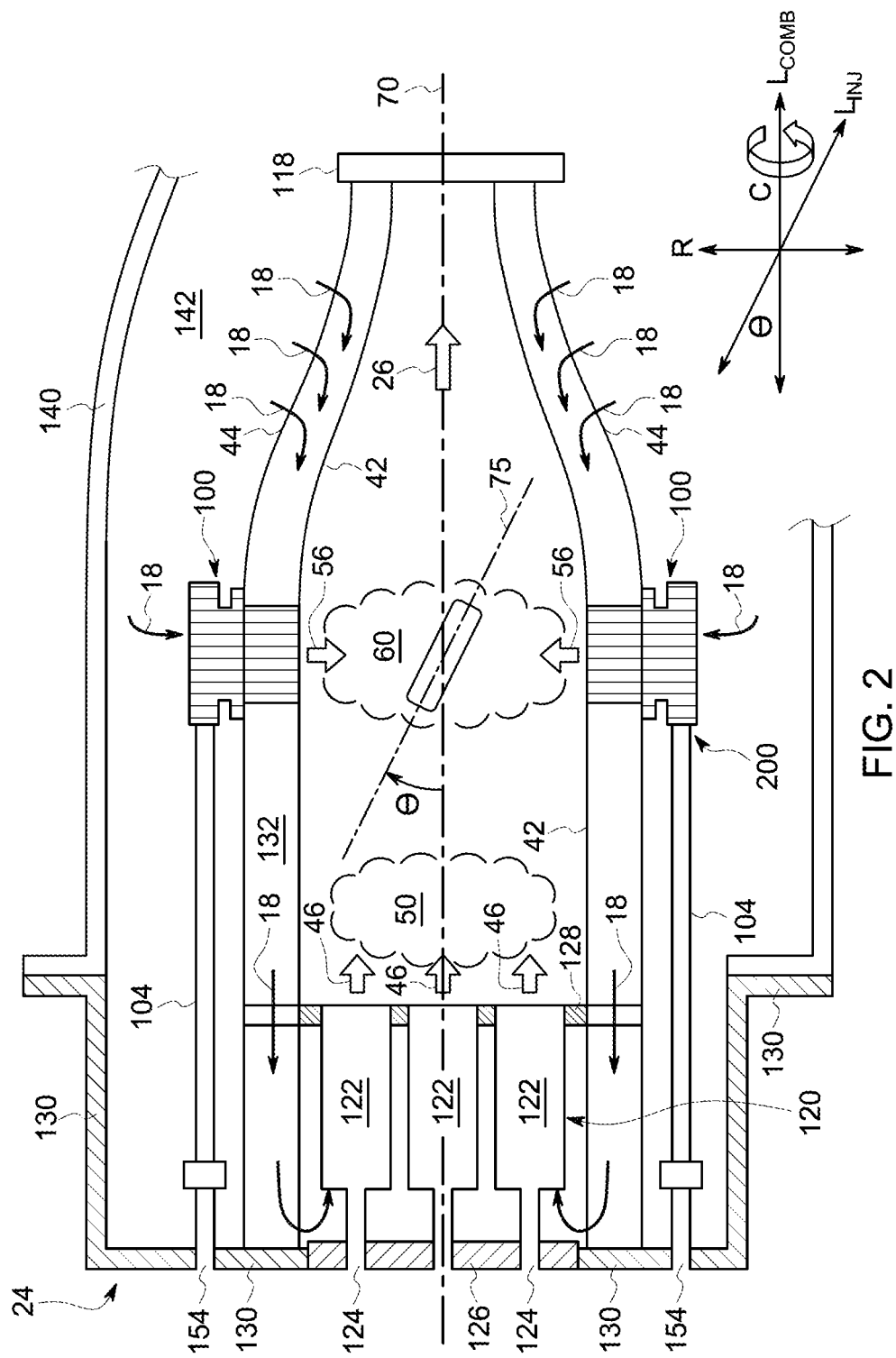
FIG. 2 is a schematic cross-sectional side view of a combustion can, including the present fuel injector.

FIG. 2 is a schematic representation of a combustion can 24, as may be included in a can annular combustion system for a heavy-duty gas turbine. In a can-annular combustion system, a plurality of combustion cans 24 (e.g., 8, 10, 12, 14, 16, or more) are positioned in an annular array about a rotor that connects a compressor to a turbine. The turbine may be operably connected (e.g., by the rotor) to a generator for producing electrical power.

In FIG. 2, the combustion can 24 includes a liner 42 that contains and conveys combustion gases 26 to the turbine. The liner 42 may have a cylindrical liner portion and a tapered transition portion that is separate from the cylindrical liner portion, as in many conventional combustion systems. Alternately, the liner 42 may have a unified body (or "unibody") construction, in which the cylindrical portion and the tapered portion are integrated with one another. Thus, any discussion of the liner 42 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

The liner 42 is surrounded by an outer sleeve 44, which is spaced radially outward of the liner 42 to define an annulus 132 between the liner 42 and the outer sleeve 44. The outer sleeve 44 may include a flow sleeve portion at the forward end and an impingement sleeve portion at the aft end, as in many conventional combustion systems. Alternately, the outer sleeve 44 may have a unified body (or "unisleeve") construction, in which the flow sleeve portion and the impingement sleeve portion are integrated with one another in the axial direction. As before, any discussion of the outer sleeve 44 herein is intended to encompass both convention combustion systems having a separate flow sleeve and impingement sleeve and combustion systems having a unisleeve outer sleeve.

A head end portion 120 of the combustion can 24 includes one or more fuel nozzles 122. The fuel nozzles 122 have a fuel inlet 124 at an upstream (or inlet) end. The fuel inlets 124 may be formed through an end cover 126 at a forward end of the combustion can 24. The downstream (or outlet) ends of the fuel nozzles 122 extend through a combustor cap 128.

The head end portion 120 of the combustion can 24 is at least partially surrounded by a forward casing 130, which is physically coupled and fluidly connected to a compressor discharge case 140. The compressor discharge case 140 is fluidly connected to an outlet of the compressor 16 (shown in FIG. 1) and defines a pressurized air plenum 142 that surrounds at least a portion of the combustion can 24. Air 18 flows from the compressor discharge case 140 into the annulus 132 through holes in the outer sleeve 44 near an aft end 118 of the combustion can 24. Because the annulus 132 is fluidly coupled to the head end portion 120, the air flow 18 travels upstream from near the aft end 118 of the combustion can 24 to the head end portion 120, where the air flow 18 reverses direction and enters the fuel nozzles 122.

The fuel nozzles 122 introduce fuel and air, as a primary fuel/air mixture 46, into a primary combustion zone 50 at a forward end of the liner 42, where the fuel and air are combusted. In one embodiment, the fuel and air are mixed within the fuel nozzles 122 (e.g., in a premixed fuel nozzle). In other embodiments, the fuel and air may be separately introduced into the primary combustion zone 50 and mixed within the primary combustion zone 50 (e.g., as may occur with a diffusion nozzle). Reference made herein to a "first fuel/air mixture" should be interpreted as describing both a premixed fuel/air mixture and a diffusion-type fuel/air mixture, either of which may be produced by fuel nozzles 122.

The combustion gases from the primary combustion zone 50 travel downstream toward an aft end 118 of the combustion can 24. One or more fuel injectors 100 introduce fuel and air, as a secondary fuel/air mixture 56, into a secondary combustion zone 60, where the fuel and air are ignited by the primary zone combustion gases to form a combined combustion gas product stream 26. Such a combustion system having axially separated combustion zones is described as an "axial fuel staging" (AFS) system 200, and the downstream injectors 100 may be referred to herein as "AFS injectors."

In the embodiment shown, fuel for each AFS injector 100 is supplied from the head end of the combustion can 24, via a fuel inlet 154. Each fuel inlet 154 is coupled to a fuel supply line 104, which is coupled to a respective AFS injector 100. It should be understood that other methods of delivering fuel to the AFS injectors 100 may be employed, including supplying fuel from a ring manifold or from radially oriented fuel supply lines that extend through the compressor discharge case 140.

FIG. 2 further shows that the AFS injectors 100 may be oriented at an angle θ (theta) relative to the longitudinal center line 70 of the combustion can 24. In the embodiment shown, the leading edge portion of the injector 100 (that is, the portion of the injector 100 located most closely to the head end) is oriented away from the center line 70 of the combustion can 24, while the trailing edge portion of the injector 100 is oriented toward the center line 70 of the combustion can 10. The angle θ, defined between the longitudinal axis 75 of the injector 100 and the center line 70, may be between 0 degrees and ±45 degrees, between 0 degrees and ±30 degrees, between 0 degrees and ±20 degrees, or between 0 degrees and ±10 degrees, or any intermediate value therebetween.

FIG. 2 illustrates the orientation of the injector 100 at a positive angle relative to the center line (longitudinal axis) 70 of the combustor. In other embodiments (not separately illustrated), it may be desirable to orient the injector 100 at a negative angle relative to the center line 70, such that the leading edge portion is proximate the center line 70, and the trailing edge portion is distal to the center line 70. In one embodiment, all the injectors 100 for a combustion can 24, if disposed at a non-zero angle, are oriented at the same angle (that is, all are oriented at the same positive angle, or all are oriented at the same negative angle).

The injectors 100 inject the second fuel/air mixture 56 into the combustion liner 42 in a direction transverse to the center line 70 and/or the flow of combustion products from the primary combustion zone, thereby forming the secondary combustion zone 60. The combined hot gases 26 from the primary and secondary combustion zones travel downstream through the aft end 118 of the combustor can 24 and into the turbine section 28 (FIG. 1), where the combustion gases 26 are expanded to drive the turbine 28.

Notably, to enhance the operating efficiency of the gas turbine 1000 and to reduce emissions, it is desirable for the injector 100 to thoroughly mix fuel and compressed gas to form the second fuel/air mixture 56. Thus, the injector embodiments described below facilitate improved mixing. Additionally, because the fuel injectors 100 include a large number of fuel injection ports, as described further below, the ability to introduce fuels having a wide range of heat release values is increased, providing greater fuel flexibility for the gas turbine operator.

Figure 3:
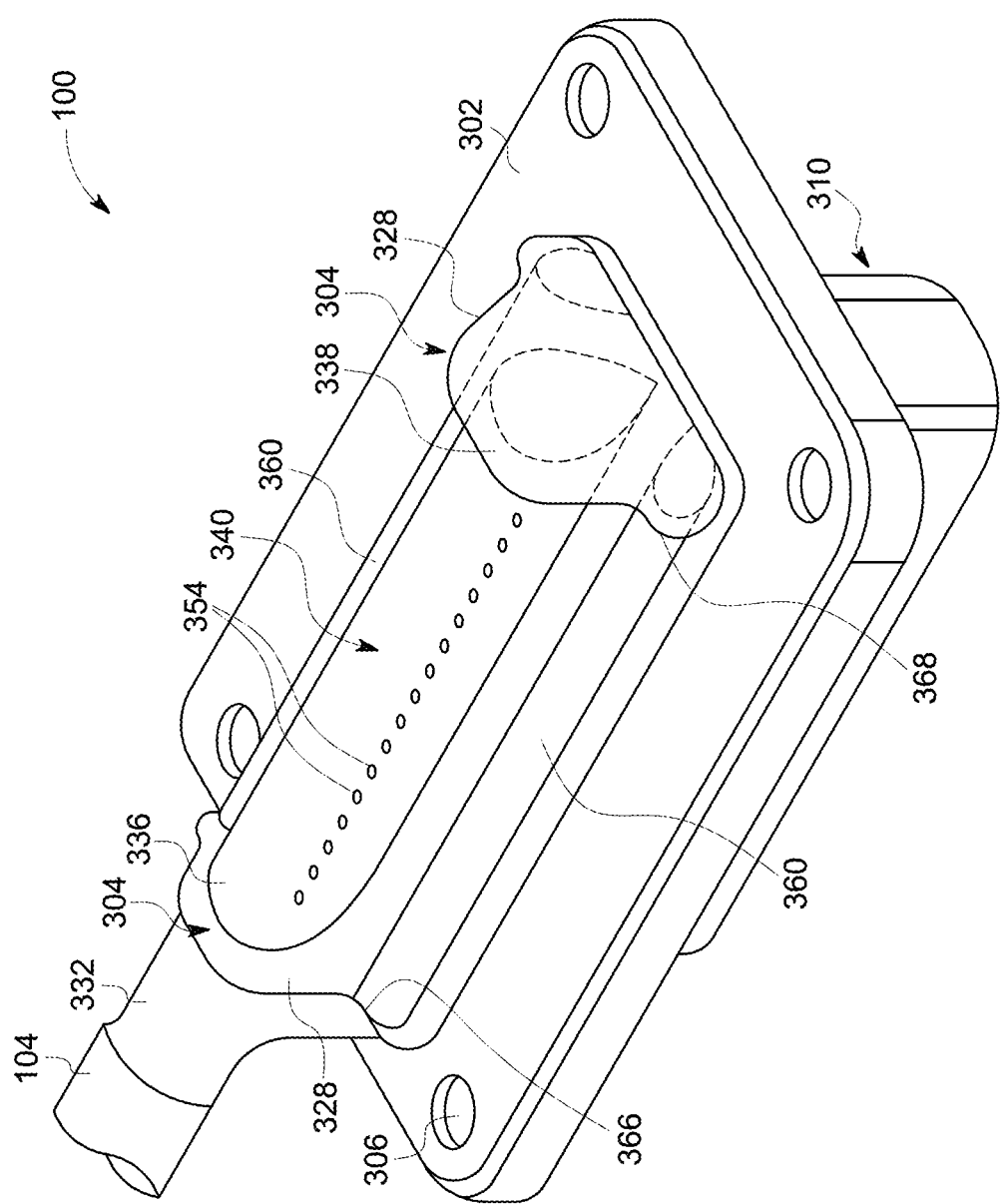
FIG. 3 is a perspective view of a fuel injector having a single fuel injection body positioned between opposing side wall fuel injection bodies, according to one aspect of the present disclosure.
Figure 4:
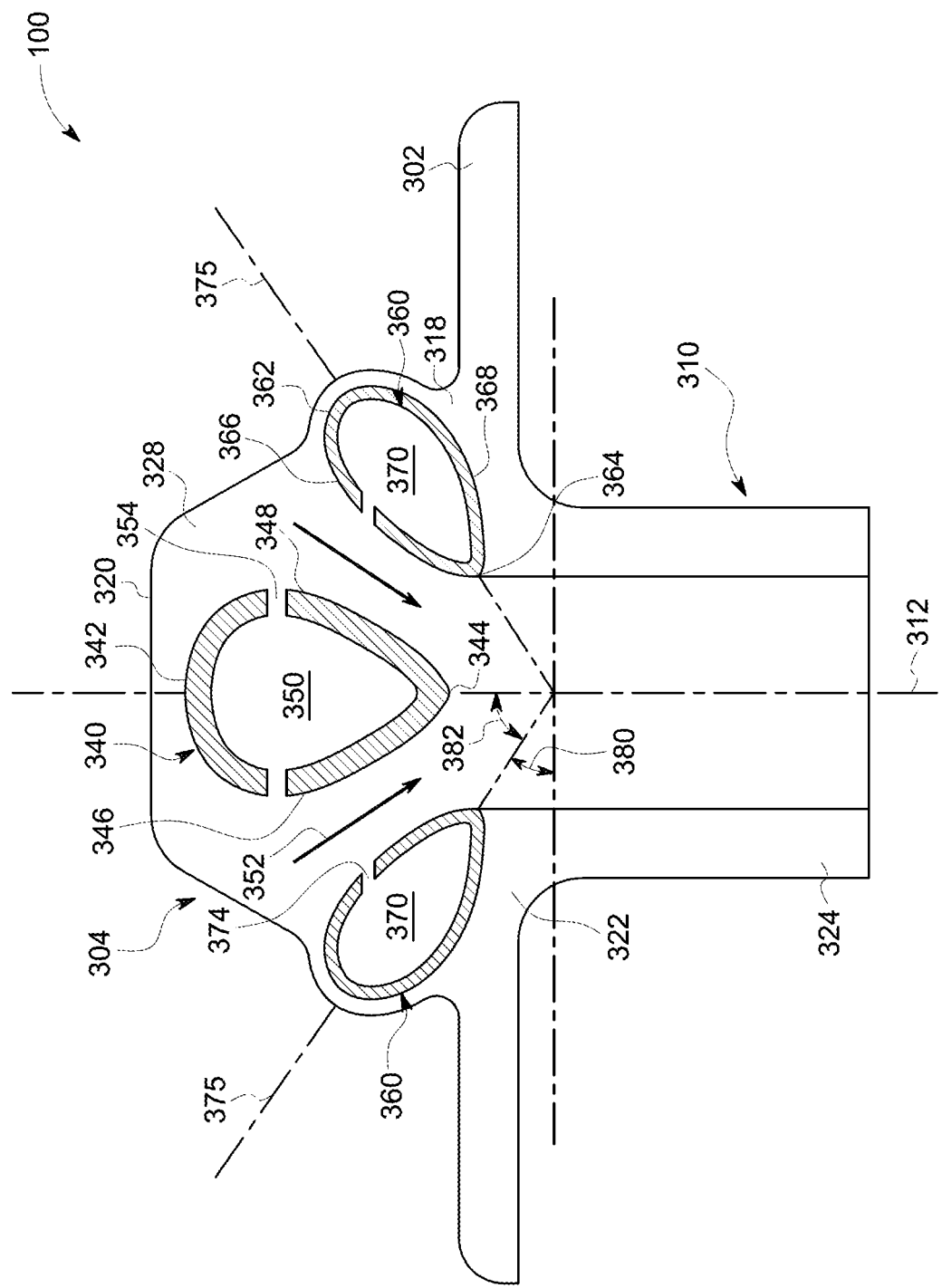
FIG. 4 is a cross-sectional view of the fuel injector of FIG. 3.

FIGS. 3 and 4 are perspective and cross-sectional views, respectively, of an exemplary fuel injector 100 for use in the AFS system 200 described above. In the exemplary embodiment, the fuel injector 100 includes a frame 304 having a pair of oppositely disposed end walls 328. At least one fuel injection body 340 is disposed between a pair of side wall fuel injection bodies 360 that define the sides of the frame 304. The fuel injection body 340 and the side wall fuel injection bodies 360 are discussed further herein. In at least one embodiment, the fuel injector 100 further includes a mounting flange 302 and an outlet member 310, which are coupled to the frame 304.

The outlet member 310 defines an injection axis 312 (shown in FIG. 4), which represents a radial dimension "R" with respect to the longitudinal axis 70 of the combustion can 24 ($L_{COMB}$, shown in FIG. 2). The fuel injector 100 further includes a longitudinal dimension (represented as axis $L_{INJ}$), which is generally perpendicular to the injection axis 312, and a circumferential dimension "C" extending about the longitudinal axis $L_{INJ}$.

Although the injection axis 312 is generally linear in the exemplary embodiment illustrated in FIGS. 3 and 4, the injection axis 312 may be non-linear in other embodiments. For example, the outlet member 310 may have an arcuate shape in other embodiments (not shown).

The outlet member 312 has a shape that may be described as an elongate slot. The elongate slot shape produces less obstruction in the annulus 132 between the liner 42 and the outer sleeve 44 for the flow traveling to the head end 120, thereby improving the durability of the liner 42. Additionally, the slot shape of the outlet member 312 improves the mixing of the secondary fuel/air mixture 56 with the combustion products from the primary combustion zone 50, thereby reducing emissions.

In the embodiment illustrated in FIGS. 3 and 4, the mounting flange 302, the frame 304, and the outlet member 310 may be manufactured as a single-piece structure (that is, are formed integrally with one another without welding or other joining methods). Alternately, in other embodiments, the flange 302 may not be formed integrally with the frame 304 and/or the outlet 310 (e.g., the flange 302 may be coupled to the frame 304 and/or the outlet 302 using a suitable fastener). Moreover, the frame 304 and the outlet 302 may be made as an integrated, single-piece unit, which is separately joined to the flange 302, perhaps using an interlocking stub flange-to-flange connection (not separately illustrated).

The flange 302, which is generally planar, defines a plurality of apertures 306 that are each sized to receive a fastener (not shown) for coupling the fuel injector 100 to the outer sleeve 44. The fuel injector 100 may have any suitable structure in lieu of, or in combination with, the flange 302 (e.g., a mounting boss) that enables the frame 304 or the outlet member 310 to be coupled to the liner 42, such that the injector 100 functions in the manner described herein.

The frame 304 defines the inlet portion of the fuel injector 100. The frame 304 includes the pair of oppositely disposed end walls 328 and a pair of oppositely disposed sides that are defined by the side wall fuel injection bodies 360 extending between the end walls 328. The side wall fuel injection bodies 360 are longer than the end walls 328, thus providing the frame 304 with a generally rectangular profile in the axial direction. The frame 304 has a first end 318 proximal to the flange 302 ("a proximal end") and a second end 320 distal to the flange 302 ("a distal end").

The outlet member 310 extends radially inward (relative to the longitudinal axis of the combustor 24) from the flange 302 on a side opposite the frame 304. The outlet member 310 defines a uniform, or substantially uniform, cross-sectional area in the radial and axial directions. The outlet member 310 provides fluid communication between the frame 304 and the interior of the liner 42 and delivers the second fuel/air mixture 56 along an injection axis 312 into the secondary combustion zone 60. The outlet member 310 has a first end 322 proximal to the flange 302 and a second end 324 distal to the flange 302 (and proximal to the liner 42), when the fuel injector 100 is installed. Further, when the fuel injector 100 is installed, the outlet member 310 is located within the annulus 132 between the liner 42 and the outer sleeve 44, such that the flange 302 is located on an outer surface of the outer sleeve 44 (as shown in FIG. 2).

Thus, the frame 304 extends radially outward from the flange 302 in a first direction, and the outlet member 310 extends radially inward from the flange 302 in a second direction opposite the first direction. The flange 302 extends circumferentially around (that is, circumscribes) the frame 304. The frame 304 and the outlet member 310 extend circumferentially about the injection axis 312 and are in flow communication with one another through the flange 302.

Although the embodiments illustrated herein present the flange 302 as being located centrally between the frame 304 and the outlet member 310, it should be understood that the flange 302 may be located at some other location or in some other suitable orientation. For instance, the frame 304 and the outlet member 310 may not extend from the flange 302 in generally opposite directions.

In some embodiments, the end walls 328 may also be oriented at an angle with respect to the flange 302. The end walls 328 have a generally linear cross-sectional profile. In other embodiments, the end walls 328 may have any suitable cross-sectional profile(s) that enables the frame 304 to be at least partly convergent (i.e., tapered) between distal end 320 and proximal end 318. Alternatively, the end walls 328 may each have a substantially linear cross-sectional profile that is oriented substantially parallel to injection axis 312.

In the exemplary embodiment, the fuel injector 100 further includes a conduit fitting 332 that supplies fuel to the fuel injection body 340 and the side wall fuel injection bodies 360. The conduit fitting 332 is formed integrally with one of the end walls 328 of the frame 304, such that the conduit fitting 332 extends generally outwardly along the longitudinal axis ($L_{INJ}$) of the injector 100. The conduit fitting 332 is connected to the fuel supply line 104 and receives fuel therefrom. The conduit fitting 332 may have any suitable size and shape, and may be formed integrally with, or coupled to, any suitable portion(s) of the frame 304 that enable the conduit fitting 332 to function as described herein.

The fuel injection body 340 has a first end 336 that is formed integrally with the end wall 328 through which the conduit fitting 332 projects and a second end 338 that is formed integrally with the end wall 328 on the opposite end of the fuel injector 100. The fuel injection body 340, which extends generally linearly across the frame 304 between the end walls 328, defines an internal fuel plenum 350 that is in fluid communication with the conduit fitting 332. In other embodiments, the fuel injection body 340 may extend across all or a portion of the frame 304 from any suitable portions of the frame 304 that enable the fuel injection body 340 to function as described herein. Alternately, or additionally, the fuel injection body 340 may define an arcuate shape between oppositely disposed end walls 328.

As mentioned above, the fuel injection body 340 has a plurality of surfaces that form a hollow structure that defines the internal plenum 350 and that extends between the end walls 328 of the frame 304. When viewed in a cross-section taken from perpendicular to the longitudinal axis $L_{INJ}$, the fuel injection body 340 (in the present embodiment) generally has the shape of an inverted teardrop with a curved leading edge 342, an oppositely disposed trailing edge 344, and a pair of opposing fuel injection surfaces 346, 348 that extend from the leading edge 342 to the trailing edge 344. The fuel injection body 340 is oriented such that the leading edge 342 is distal to the flange 302, and the trailing edge 344 is located proximate to the flange 302.

Each fuel injection surface 346, 348 faces a respective side wall fuel injection body 360, thus defining a pair of flow paths 352 that intersect with one another downstream of the trailing edge 344 and upstream of, or within, the outlet member 310. The flow paths 352 may be of uniform dimensions from the distal end 320 of the frame 304 to the proximal end 318 of the frame 304, or the flow paths 352 may converge from the distal end 320 to the proximal end 318, thereby accelerating the flow.

Each fuel injection surface 346, 348 includes a plurality of fuel injection ports 354 that provide fluid communication between the internal plenum 350 and the flow paths 352. The fuel injection ports 354 are spaced along the length of the fuel injection surfaces 346, 348 (see FIG. 3), for example, in any manner (e.g., one or more rows with ports 354 evenly or unevenly spaced) suitable to enable the fuel injection body 340 to function as described herein.

Each side wall fuel injection body 360 has a first end 366 that is formed integrally with the end wall 328 through which the conduit fitting 332 projects and a second end 368 that is formed integrally with the end wall 328 on the opposite end of the fuel injector 100. Each side wall fuel injection body 360, which extends generally linearly across the frame 304 between the end walls 328, defines an internal fuel plenum 370 that is in fluid communication with the conduit fitting 332. In other embodiments, the side wall fuel injection body 360 may define an arcuate (or non-linear) shape between oppositely disposed end walls 328.

Each side wall fuel injection body 360 has a plurality of surfaces that form a hollow structure that defines the internal plenum 370 and that extends between the end walls 328 of the frame 304. When viewed in a cross-section taken from perpendicular to the longitudinal axis $L_{INJ}$, the side wall fuel injection bodies 360 (in the present embodiment) generally have the shape of inverted teardrops, each with a curved leading edge 362, an oppositely disposed trailing edge 364, and a pair of opposing surfaces 366, 368 that extend from the leading edge 362 to the trailing edge 364. The fuel injection body 360 is oriented such that the leading edge 362 is distal to the flange 302, and the trailing edge 364 is located proximate to the flange 302.

The surface 346, which faces the fuel injection body 340, defines a fuel injection surface that includes a plurality of fuel injection ports 374. The fuel injection ports 374 provide fluid communication between the internal plenum 370 and the flow paths 352. The fuel injection ports 374 are spaced along the length of the fuel injection surface 366, for example, in any manner (e.g., one or more rows with ports 374 evenly or unevenly spaced) suitable to enable the side wall fuel injection body 360 to function as described herein. The surface 348, which is proximal to the flange 302, defines a solid surface having no fuel injection ports.

Further, as shown in FIGS. 3 and 4, the side wall fuel injection bodies 360 of the frame 304 are each oriented at a first angle 380 with respect to the flange 302 and at a second angle 382 with respect to the injection axis 312. In the exemplary illustrated embodiment, the first angle 380 and the second angle 382 are complementary to one another (that is, sum to 90-degrees). The first angle 380 is defined between the flange 302 (or an imaginary line parallel to the flange, in some instances) and a longitudinal axis 375 defined through the leading edge 362 and the trailing edge 364 of the side wall fuel injection body 360. The second angle 382 is defined between the longitudinal axis 375 of the side wall fuel injection body 360 and the injection axis 312 of the fuel injector 100.

Figure 5:
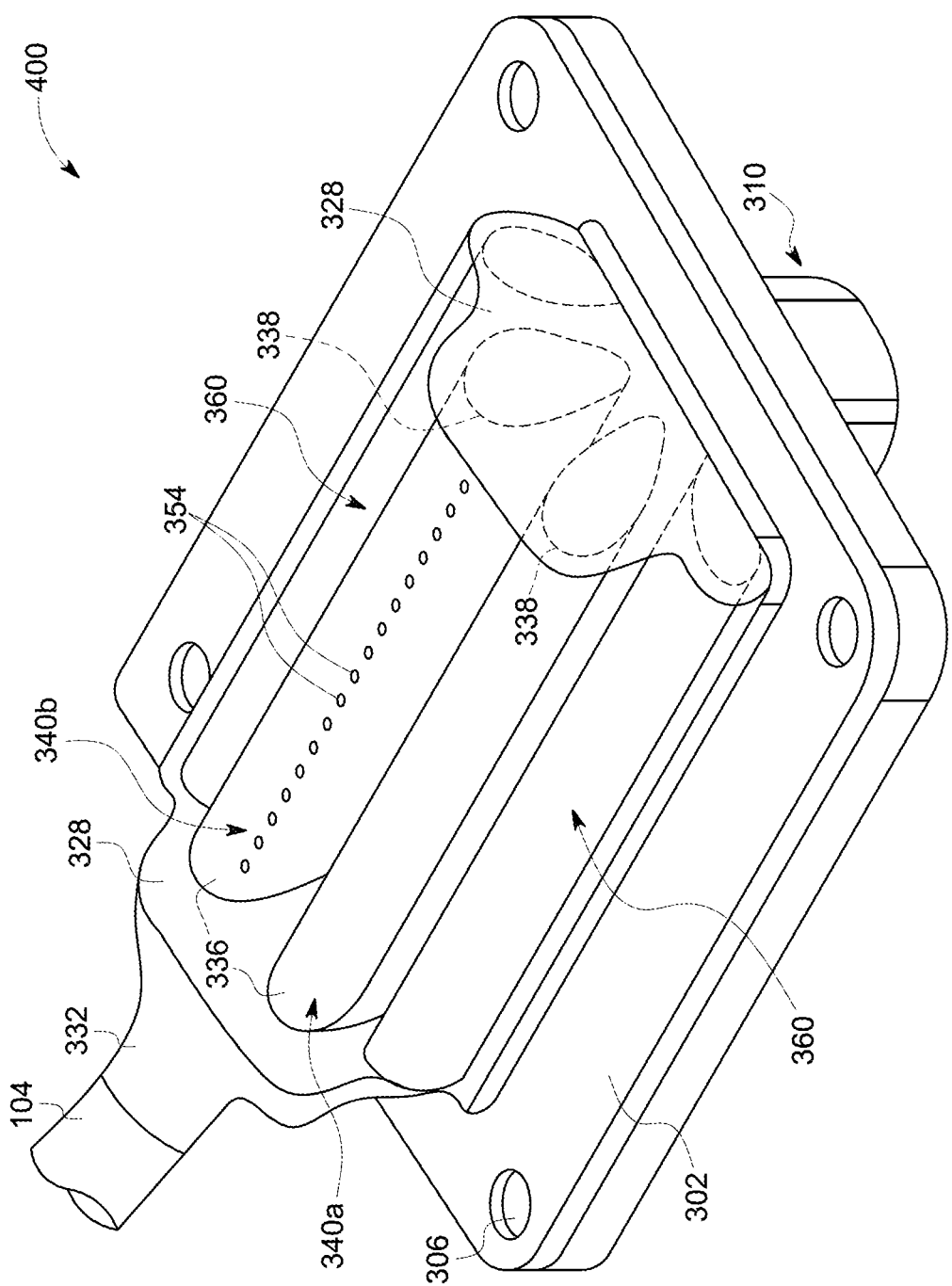
FIG. 5 is a perspective view of a fuel injector having a pair of fuel injection bodies positioned between opposing side wall fuel injection bodies, according to another aspect of the present disclosure.
Figure 6:
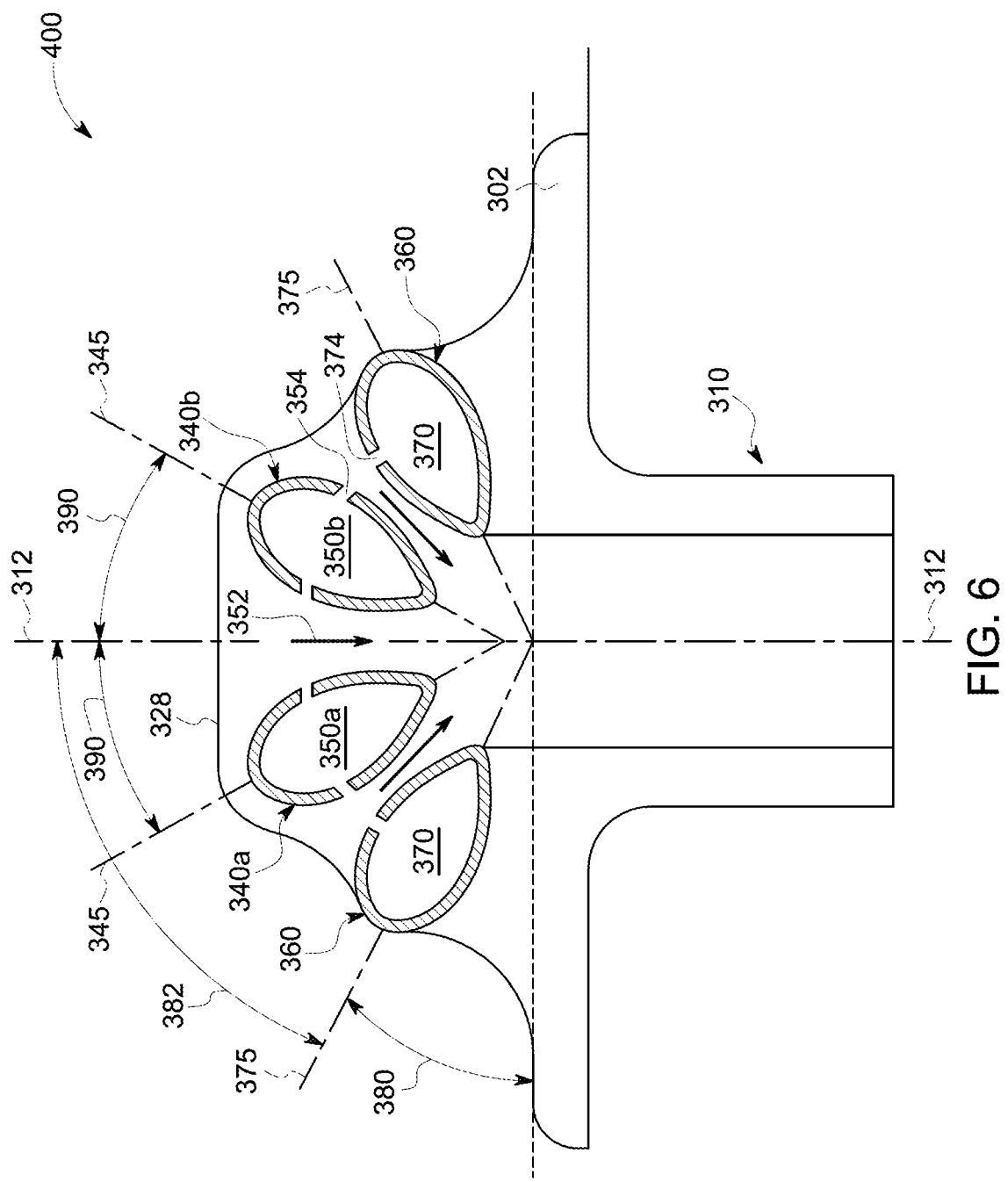
FIG. 6 is a cross-sectional view of the fuel injector of FIG. 5.

Notably, the fuel injector 100 may have more than one fuel injection body 340 extending across the frame 304 in any suitable orientation that defines a suitable number of flow paths 352. For example, in the embodiment shown in FIGS. 5 and 6, a fuel injector 400 includes a pair of adjacent fuel injection bodies 340a, 340b positioned between the pair of side wall fuel injection bodies 360, discussed above, such that three spaced flow paths 352 are defined within the frame 304. In one embodiment, the flow paths 352 are equally spaced, as results from the fuel injection bodies 340 being oriented at the same angle (i.e., angle 390) with respect to the injection axis 312 and the side wall fuel injection bodies 360 being oriented at the same angle (i.e., angle 382) with respect to the injection axis 312. The angle 390 is defined between a longitudinal axis 345 extending through the leading edge 342 and the trailing edge 344 of the fuel injection body 340(a or b) and the injection axis 312 of the fuel injector 312.

Each fuel injection body 340a, 340b includes the plurality of fuel injection ports 354 on at least one fuel injection surface 346 or 348, as described above, such that the fuel injection ports 354 are in fluid communication with the respective plenum 350a, 350b defined within each fuel injection body 340a, 340b. In turn, the plenums 350a, 350b are in fluid communication with the conduit fitting 332, which receives fuel from the fuel supply line 104. The side fuel injection bodies 360 are configured as described above.

Referring now to both the single- and double-injection body embodiments shown in FIGS. 3-6, during certain operations of the combustion can 24, compressed gas flows into the frame 340 and through the flow paths 352. Simultaneously, fuel is conveyed through the fuel supply line 104 and through the conduit fitting 302 to the internal plenum(s) 350 (or 350a, 350b) of the one or more fuel injection bodies 340 (or 340a, 340b). Fuel passes from the plenum 350 through the fuel injection ports 354 on the fuel injection surfaces 346 and/or 348 of each fuel injection body 340 and into the flow paths 352, where the fuel mixes with the compressed air. The fuel injection ports 354 may be normal to the injection surface 346 or 348, or the fuel injection ports 354 may be angled relative to the fuel injection surface 346, 348. The fuel and the compressed air form the second fuel/air mixture 56, which is injected through the outlet member 310 into the secondary combustion zone 60 (as shown in FIG. 2).

Figure 8:
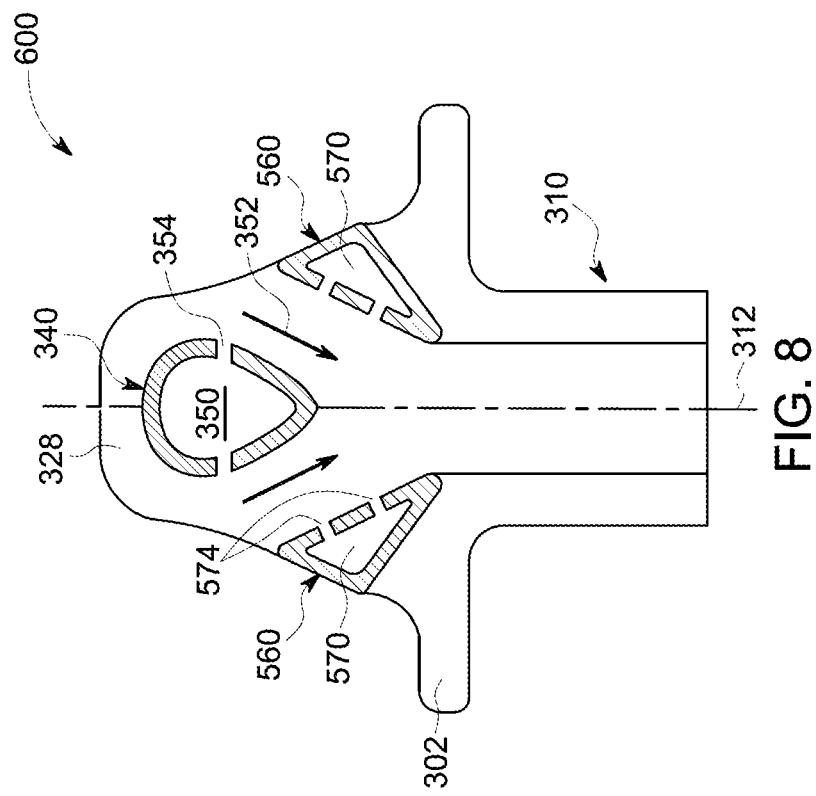
FIG. 8 is a cross-sectional view of an alternate embodiment of the fuel injector of FIG. 3, in which the side wall fuel injection bodies have a triangular cross-sectional shape.
Figure 7:
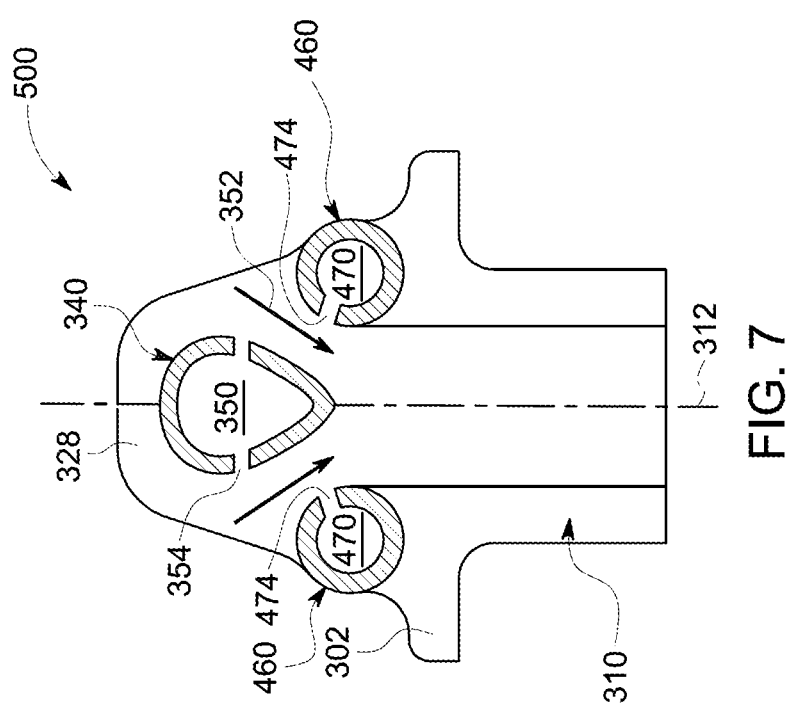
FIG. 7 is a cross-sectional view of an alternate embodiment of the fuel injector of FIG. 3, in which the side wall fuel injection bodies have a circular cross-sectional shape.

FIGS. 7 and 8 describe alternate configurations of the side wall fuel injection bodies (i.e., 360) within the fuel injector. As shown in FIG. 7, a fuel injector 500 includes a pair of side wall fuel injection bodies 460 having a circular cross-sectional profile. The side wall fuel injection bodies 460 define respective fuel plenums 470. One or more fuel injection ports 474 are defined through the side wall fuel injection bodies 460 such that fuel is injected through the fuel injection ports 374 into the flow paths 352. As described above, fuel is also injected from the fuel plenum 350 defined by the fuel injection body 340, via fuel injection ports 354.

FIG. 8 illustrates a fuel injector 600 that includes a pair of side wall fuel injection bodies 560 having a triangular cross-sectional profile. The side wall fuel injection bodies 560 define respective fuel plenums 570. One or more fuel injection ports 574 are defined through the side wall fuel injection bodies 560 such that fuel is injected through the fuel injection ports 574 into the flow paths 352. As described above, fuel is also injected from the fuel plenum 350 defined by the fuel injection body 340, via fuel injection ports 354.

While FIGS. 7 and 8 illustrate a configuration having a single fuel injection body 340 disposed between the side wall fuel injection bodies 460, 560, it should be understood that two or more fuel injection bodies 340 may instead by employed.

The present fuel injectors described herein facilitate enhanced mixing of fuel and compressed gas in a combustor to reduce emissions. The present fuel injectors and AFS systems therefore facilitate improving the overall operating efficiency of a combustor such as, for example, a combustor in a gas turbine assembly. This increases the output and reduces the cost associated with operating a combustor such as, for example, a combustor in a gas turbine assembly.

Exemplary embodiments of fuel injectors and methods of using the same are described above in detail. The methods and systems described herein are not limited to the specific embodiments described herein, but rather, components of the methods and systems may be utilized independently and separately from other components described herein. For example, the methods and systems described herein may have other applications not limited to practice with turbine assemblies, as described herein. Rather, the methods and systems described herein can be implemented and utilized in connection with various other industries.

While the technical advancements have been described in terms of various specific embodiments, those skilled in the art will recognize that the technical advancements can be practiced with modification within the spirit and scope of the claims.

What is claimed is:

1. A fuel injector configured to be mounted to provide fluid communication in a transverse direction with respect to a longitudinal axis of a combustor, the fuel injector comprising:

a frame having oppositely disposed end walls, the end walls extending in the transverse direction, a first side wall fuel injection body defining a first fuel plenum, and, opposite the first side wall fuel injection body, a second side wall fuel injection body defining a second fuel plenum, the first side wall fuel injection body and the second side wall fuel injection body extending parallel to each other axially between the end walls and, with the end walls, defining an opening for passage of air;

a third fuel injection body defining a third fuel plenum, the third fuel injection body extending axially between the end walls and being positioned between and parallel to the first side wall fuel injection body and the second side wall fuel injection body, the fuel injector further including air flow paths between the third fuel injection body and each of the first side wall fuel injection body and the second side wall fuel injection body;

wherein the first side wall fuel injection body comprises at least one outer surface through which a first plurality of fuel injection ports is defined, the second side wall fuel injection body comprises at least one outer surface through which a second plurality of fuel injection ports is defined, and the third fuel injection body comprises at least one outer surface through which a third plurality of fuel injection ports is defined, each plurality of fuel injection ports being in fluid communication with the respective fuel plenum and an adjacent air flow path of the air flow paths; and a conduit fitting coupled to the frame and fluidly connected to the respective fuel plenums of the first side wall fuel injection body, the second side wall fuel injection body, and the third fuel injection body.

2. The fuel injector of claim 1, comprising a mounting flange coupled to the frame.

3. The fuel injector of claim 2, comprising an outlet member extending from the mounting flange in a direction opposite the frame, the outlet member being in fluid communication with the air flow paths; and wherein the outlet member comprises a shape of an elongate slot.

4. The fuel injector of claim 1, wherein the first side wall fuel injection body and the second side wall fuel injection body each have a cross-sectional profile defining one of a teardrop shape, a circular shape, and a triangular shape.

5. The fuel injector of claim 4, wherein the first side wall fuel injection body and the second side wall fuel injection body each have a cross-sectional profile defining a teardrop shape, the at least one outer surface of the first side wall fuel injection body and the at least one outer surface of the second side wall fuel injection body each having a leading edge, a trailing edge opposite the leading edge, a first outer surface, and a second outer surface opposite the first outer surface, the first outer surface and the second outer surface extending between the leading edge and the trailing edge; and wherein the first outer surface of the first side wall fuel injection body defines the first plurality of fuel injection ports, and the first outer surface of the second side wall fuel injection body defines the second plurality of fuel injection ports.

6. The fuel injector of claim 5, wherein the first plurality of fuel injection ports defined through the first outer surface of the first side wall fuel injection body is arranged in a single row.

7. The fuel injector of claim 5, wherein a first axis is defined through the leading edge and the trailing edge of the first side wall fuel injection body, and a second axis is defined through the leading edge and the trailing edge of the second side wall fuel injection body; and wherein a first angle defined between the first axis and an injection axis of the fuel injector is equal to a second angle defined between the second axis and the injection axis.

8. The fuel injector of claim 1, wherein the third fuel injection body has a cross-sectional profile defining a teardrop shape, the at least one outer surface of the third fuel injection body having a leading edge, a trailing edge opposite the leading edge, and a pair of outer surfaces extending between the leading edge and the trailing edge, at least one of the pair of outer surfaces defining the third plurality of fuel injection ports.

9. The fuel injector of claim 8, wherein a first subset of the third plurality of fuel injection ports is defined through a first fuel injection surface of the pair of outer surfaces and a second subset of the third plurality of fuel injection ports is defined through a second fuel injection surface of the pair of outer surfaces.

10. The fuel injector of claim 1, further comprising a fourth fuel injection body disposed between the end walls and positioned within the opening; and wherein the fourth fuel injection body defines a fourth fuel plenum in fluid communication with the conduit fitting and comprises at least one outer surface defining a fourth plurality of fuel injection ports in fluid communication with the fourth plenum.

11. The fuel injector of claim 10, wherein the fourth fuel injection body has a cross-sectional profile defining a teardrop shape, the at least one outer surface of the fourth fuel injection body having a leading edge, a trailing edge opposite the leading edge, and a pair of outer surfaces extending between the leading edge and the trailing edge.

12. The fuel injector of claim 10, wherein a third axis is defined through a leading edge and a trailing edge of the third fuel injection body, and a fourth axis is defined through a leading edge and a trailing edge of the fourth fuel injection body; and wherein a third angle defined between the third axis and an injection axis of the fuel injector is equal to a fourth angle defined between the fourth axis and the injection axis.

13. The fuel injector of claim 11, wherein the at least one outer surface of the third fuel injection body comprises a first fuel injection surface and a second fuel injection surface, the third plurality of fuel injection ports of the third fuel injection body comprises a first subset of the third plurality of fuel injection ports defined through the first fuel injection surface and a second subset of the third plurality of fuel injection ports defined through the second fuel injection surface; and wherein the fourth plurality of fuel injection ports of the fourth fuel injection body comprises a first subset of the fourth plurality of fuel injection ports defined through a first fuel injection surface of the pair of outer surfaces and a second subset of the fourth plurality of fuel injection ports defined through a second fuel injection surface of the pair of outer surfaces.

14. A combustor for a gas turbine, the combustor comprising:
  a liner defining a combustion chamber, the liner defining a head end, an aft end, and at least one opening therethrough between the head end and the aft end; and
  an axial fuel staging (AFS) system comprising:
  a fuel injector, the fuel injector being mounted to provide fluid communication through a respective one of the at least one openings in the liner, the fluid communication being directed in a transverse direction with respect to a longitudinal axis of the liner; and
  a fuel supply line coupled to the fuel injector;
  wherein the injector further comprises:
  a frame having oppositely disposed end walls, the end walls extending in the transverse direction, a first side wall fuel injection body defining a first fuel plenum, and, opposite the first side wall fuel injection body, a second side wall fuel injection body defining a second fuel plenum, the first side wall fuel injection body and the second side wall fuel injection body extending parallel to each other axially between the end walls and, with the end walls, defining an opening for passage of air;
  a third fuel injection body defining a third fuel plenum, the third fuel injection body extending axially between the end walls and being positioned between and parallel to the first side wall fuel injection body and the second side wall fuel injection body, the fuel injector further including air flow paths between the third fuel injection body and each of the first side wall fuel injection body and the second side wall fuel injection body;
  wherein the first side wall fuel injection body comprises at least one outer surface through which a first plurality of fuel injection ports is defined, the second side wall fuel injection body comprises at least one outer surface through which a second plurality of fuel injection ports is defined, and the third fuel injection body comprises at least one outer surface through which a third plurality of fuel injection ports is defined, each plurality of fuel injection ports being in fluid communication with the respective fuel plenum and an adjacent air flow path of the air flow paths; and a conduit fitting coupled to the frame and fluidly connected to the respective fuel plenums of the first side wall fuel injection body, the second side wall fuel injection body, and the third fuel injection body; wherein the fuel supply line is coupled to the conduit fitting.

15. The combustor of claim 14, wherein the fuel injector further comprises a mounting flange coupled to the frame and an outlet member extending from the mounting flange in a direction opposite the frame, the outlet member being in fluid communication with the air flow paths; and wherein the outlet member comprises a shape of an elongated slot.

16. The combustor of claim 14, wherein each of the first side wall fuel injection body and the second side wall fuel injection body of the fuel injector has a cross-sectional profile defining a teardrop shape, the at least one outer surface of the first side wall fuel injection body and the at least one outer surface of the second side wall fuel injection body each having a leading edge, a trailing edge opposite the leading edge, a first outer surface, and a second outer surface opposite the first outer surface, the first outer surface and the second outer surface extending between the leading edge and the trailing edge; and wherein the first outer surface the first side wall fuel injection body defines the first plurality of fuel injection ports and the first outer surface of the second side wall fuel injection body defines the second plurality of fuel injection ports.

17. The combustor of claim 14, wherein the third fuel injection body of the fuel injector has a cross-sectional profile defining a teardrop shape, the at least one outer surface of the third fuel injection body having a leading edge, a trailing edge opposite the leading edge, and a pair of outer surfaces extending between the leading edge and the trailing edge, at least one of the pair of outer surfaces defining the third plurality of fuel injection ports.

18. The combustor of claim 14, wherein the fuel injector comprises a fourth fuel injection body disposed between the end walls and positioned within the opening; wherein the fourth fuel injection body defines a fourth fuel plenum and comprises at least one outer surface defining a fourth plurality of fuel injection ports in fluid communication with the fourth plenum; and wherein the fourth fuel plenum is in fluid communication with the conduit fitting.

19. The combustor of claim 18, wherein the fourth fuel injection body of the fuel injector has a cross-sectional profile defining a teardrop shape, the at least one outer surface of the fourth fuel injection body having a leading edge, a trailing edge opposite the leading edge, and a pair of outer surfaces extending between the leading edge and the trailing edge; and wherein the third fuel injection body and the fourth fuel injection body are disposed at equal angles relative to an injection axis of the fuel nozzle.

20. The combustor of claim 14, wherein the fuel injector of the AFS system is one of a plurality of fuel injectors; and wherein the head end comprises at least one fuel nozzle.

\* \* \* \* \*